(12) United States Patent
Sawai et al.

(10) Patent No.: US 7,530,697 B2
(45) Date of Patent: May 12, 2009

(54) ILLUMINATION OPTICS AND IMAGE PROJECTING APPARATUS HAVING THEREOF

(75) Inventors: Yasumasa Sawai, Yamatotakada (JP); Kazuhiko Inoue, Sakai (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 430 days.

(21) Appl. No.: 11/405,730

(22) Filed: Apr. 18, 2006

(65) Prior Publication Data

US 2006/0244929 A1 Nov. 2, 2006

(30) Foreign Application Priority Data

Apr. 27, 2005 (JP) .............................. 2005-129804

(51) Int. Cl.
*G03B 21/14* (2006.01)

(52) U.S. Cl. ............................. 353/94; 353/84; 348/743

(58) Field of Classification Search ................. 353/84, 353/94; 349/5; 348/742, 743, 771
See application file for complete search history.

(56) References Cited

U.S. PATENT DOCUMENTS

| 6,505,939 | B1 * | 1/2003 | Bierhuizen et al. ............ 353/94 |
| 6,666,558 | B1 | 12/2003 | Yamagishi et al. |
| 7,316,484 | B2 * | 1/2008 | Hatakeyama ................ 353/102 |
| 2007/0121084 | A1 * | 5/2007 | Chang .......................... 353/94 |

* cited by examiner

*Primary Examiner*—William C Dowling
(74) *Attorney, Agent, or Firm*—Sidley Austin LLP (57) ABSTRACT

An illumination optics includes a plurality of light source sections for emiting light beams and a time sharing color separation device having a plurality of color filters. The color filters are rotationally moved so as to cross optical paths of the emitted light beams from the light source sections, thereby separate the emitted light beams to enter there into different color light beams in a time-sharing state. The reference axes of the emitted light beams to enter the time sharing color separation device are separated from each other, and the color filters are formed so that border lines of the adjacent color filters cross the reference axes approximately simultaneously at the time of rotation.

18 Claims, 6 Drawing Sheets

ILLUMINATION OPTICS AND IMAGE PROJECTING APPARATUS HAVING THEREOF

This application is based on the application No. 2005-129804 filed in Japan on Apr. 27, 2005, the entire content of which is hereby incorporated by reference.

BACKGROUND OF THE INVENTION

1. Field of the Invention

The present invention relates to an illumination optics and an image projecting apparatus having thereof. The invention relates to, for example, the illumination optics which is used for a projector and synthesizes light fluxes emitted from two lamps so as to supply the synthesized light flux to a light modulating device, and the image projecting apparatus having thereof.

2. Description of the Related Art

Presently, high brightness is required in projectors, particularly, data projectors. Lamps, which are currently supplied and have short arc length, have good system efficiency, but their output is limited. For this reason, in a system (image projecting apparatus) which use only one lamp, its output as a system is limited, and heightening of its brightness is limited. Meanwhile, lamps having high output have a short life, and require frequent maintenance such as lamp exchange in the market. As optics of lamps for projectors, therefore, illumination optics which use two lamps whose output is limited as independent lamp so as to obtain large output are now the mainstream.

Such an illumination optics is disclosed in, for example, U.S. Pat. No. 6,505,939 (hereinafter, US' 939). The illumination optics in US' 939 synthesizes light beams from two light sources using an integrator rod and supplies the synthesized light beam to a light modulating device via a color wheel. When the integrator rod is used, the light whose illuminance distribution is made to be uniform can be supplied to the light modulating device via the color wheel.

On the other hand, an illumination optics which uses a plurality of lamps but does not use an integrator rod is disclosed in, for example, U.S. Pat. No. 6,666,558 (US' 558). In the illumination optics in US' 558, light sources and light condensing devices are arranged so that condensing positions of light beams emitted from the respective light sources are superposed on each other on a color wheel or its vicinity by the light condensing devices (for example, elliptical mirrors) corresponding to the light sources. As a result, the size of a light source image which is formed on the color wheel or its vicinity is suppressed to minimum, and thus enlargement of the color wheel and image deterioration due to color mixing are avoided.

Like US' 939, however, when the color wheel is arranged on the light emission side of the integrator rod, a light emission surface of the integrator rod and a modulation surface of the light modulating device are approximately optically-conjugated. For this reason, when boundary portions of respective color filters of the color wheel cross the light emission surface of the integrator rod, color information of the light passing through the respective color filters cutting across the boundary portions is reflected directly onto the modulation surface. As a result, color shading partially occurs on the modulation surface, the quality of the image to be projected onto a screen via the light modulating device is deteriorated. When the boundary portions of the respective color filters cross the light emission surface of the integrator rod, switching of the light modulating device into an OFF state causes deterioration in light utilization efficiency (brightness), and thus the switching is not appropriate. In order to avoid the above inconvenience, therefore, it is desirable that the color wheel is arranged on the light incident side of the integrator rod.

Like US' 558, however, when the light condensing positions of the light beams emitted from the light sources are superposed on each other on the color wheel or its vicinity by the light condensing devices corresponding to the light sources, considerable heat energy is generated on the light condensing position. The respective color filters of the color wheel are formed by, for example, dielectric films, and thus their heat resistance is inferior. For this reason, when the considerable heat energy is generated concentratedly one point of the color wheel or its vicinity, the property of the color wheel is deteriorated or changed. Like US' 558, therefore, when the light condensing positions of the emitted light beams from the light sources are superposed on each other on the color wheel or its vicinity, the arrangement of the color wheel on the light incident side of the integrator rod is prevented.

SUMMARY OF THE INVENTION

The present invention is devised in order to solve the above problems. It is an object of the present invention to provide an illumination optics in which a deterioration in a property of a color wheel is avoided so that the color wheel can be arranged on a light incident side of an integrator rod, so that color mixing is suppressed to minimum at the time of passing through the color wheel and a deterioration in image quality of a projected image can be avoided. Further, it is an object to provide an image projecting apparatus having such an illumination optics.

In order to solve the above problems, according to a first aspect of the present invention, an image projecting apparatus includes: a plurality of light source sections for emitting light beams; and a time sharing color separation device having different color filters arranged on one plane. The color filters are rotationally moved so as to cross optical paths of the emitted light beams from the light source sections, thereby separate the emitted light beams to enter there into different color light beams in a time-sharing state. When optical axes of the emitted light beams or axes on extended lines including the optical axes are determined as reference axes, the reference axes of the emitted light beams to enter the time sharing color separation device are separated from each other, and the color filters are formed so that border lines of the adjacent color filters cross the reference axes approximately simultaneously at the time of rotation.

According to a second aspect of the present invention, an illumination optics includes a first light source section for emitting a first light beam; a second light source section for emitting a second light beam; and a time sharing color separation device having a plurality of color filters on one plane. The color filters are rotationally moved so as to cross the light beams, thereby separate the light beams to enter there into different color light beams in a time sharing state. The color filters are arranged so that the first and second light beams enter the color filters along a direction of a boundary line of the adjacent color filters.

According to a third aspect of the present invention, an image projecting apparatus includes the above illumination optics of the present invention, a light modulating device for modulating the light beam supplied from the illumination optics, and a projecting optics for projecting the light modulated by the light modulating device to a surface to be projected.

BRIEF DESCRIPTION OF THE DRAWINGS

These and other objects, advantages and features of the invention will become apparent from the following description thereof taken in conjunction with the preferred embodiments with the reference to the accompanying drawings in which.

DETAILED DESCRIPTION OF THE PREFERRED EMBODIMENT

One embodiment of the present invention is explained below with reference to the drawings.

(1. The Constitution of the Image Projecting Apparatus)

Figure 2:
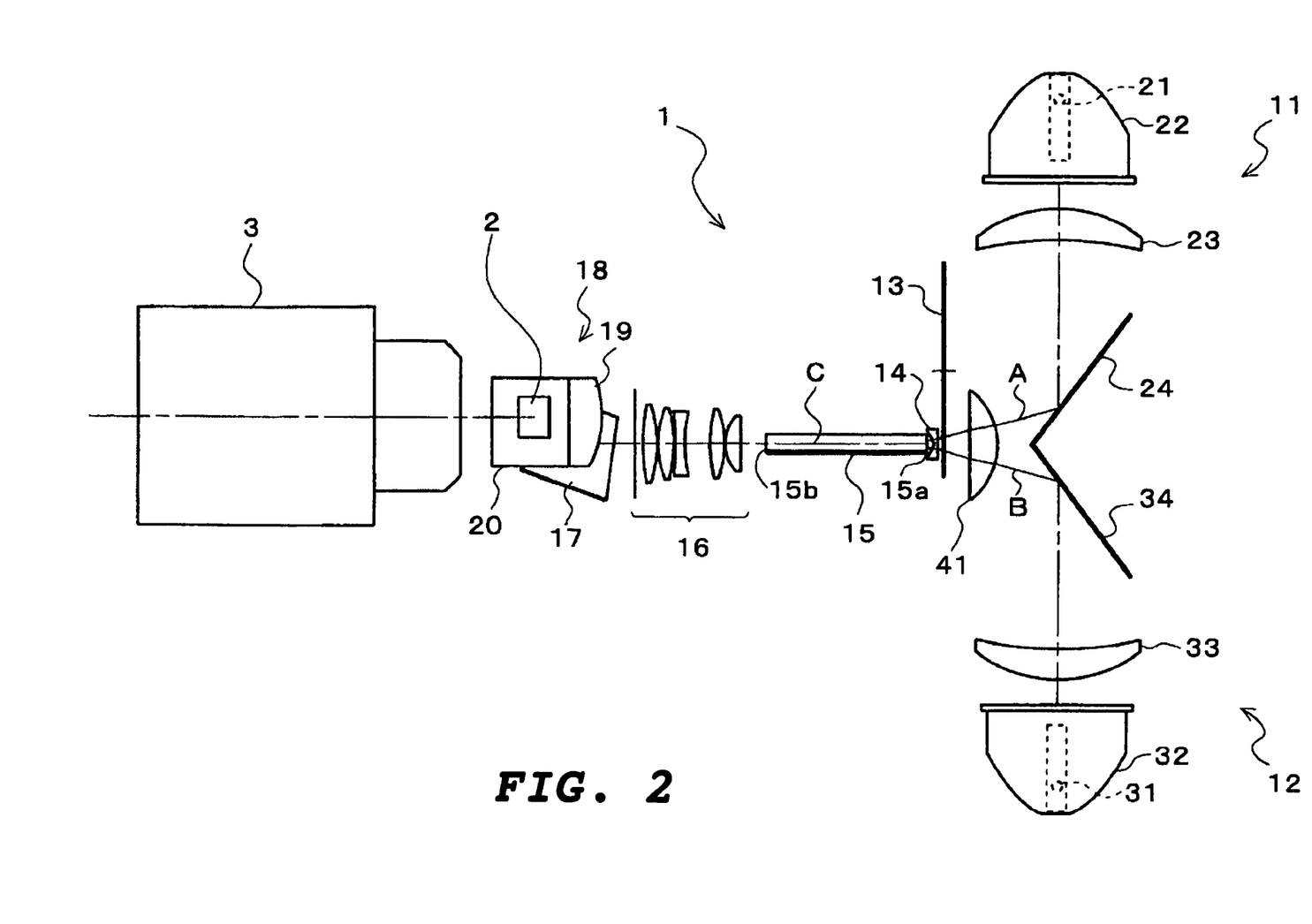
FIG. 2 is a plan view typically illustrating a schematic constitution of the image projecting apparatus in FIG. 1.
Figure 3:
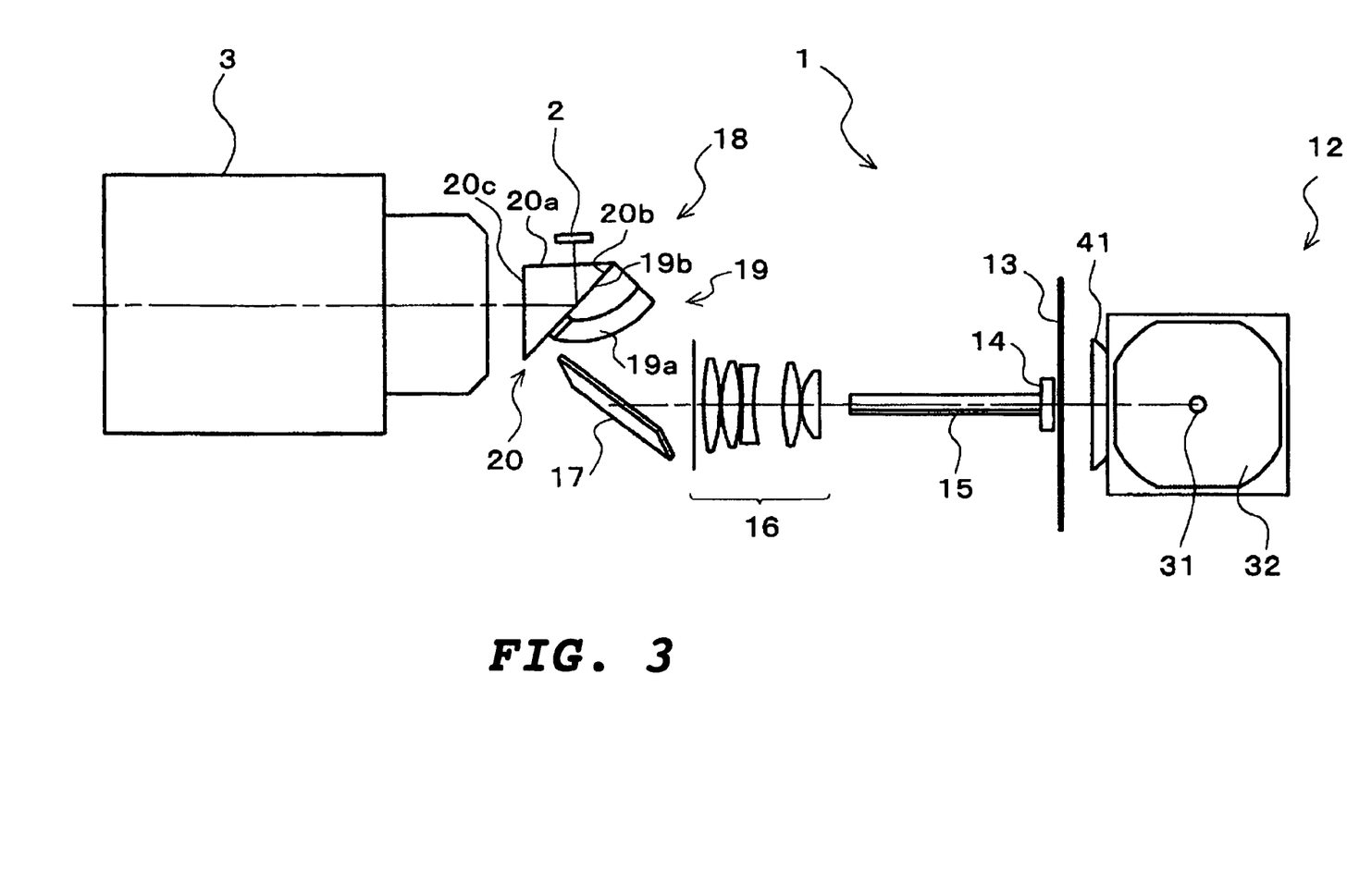
FIG. 3 is a side view of the image projecting apparatus in FIG. 1.

FIG. 2 is a plan view typically illustrating a schematic constitution of the image projecting apparatus according to an embodiment, and FIG. 3 is a side view of the image projecting apparatus. The image projecting apparatus of the embodiment has an illumination optics 1, a DMD 2 (Digital Micromirror Device; produced by Texas Instruments, Ltd.), and a projecting optics 3.

The illumination optics 1 is an optics for synthesizing emitted light beams from a plurality of light sources and supplying the synthesized light to the DMD 2, and its detailed constitution is mentioned later.

The DMD 2 is constituted so that micromirrors which tilt in an ON state or an OFF state according to image data of a display image are arranged in a matrix pattern, and it is a light modulating device which modulates the light supplied from the illumination optics 1 according to image data. More specifically, the DMD 2 has a rectangular image display area which is formed by the matrix arrangement of the micromirrors. Each mirror of the DMD 2 corresponds to one pixel, and each mirror has a deflecting axis which forms an angle of 45° with the rectangular display area. Each mirror deflects ±12° with the deflecting axis being the center according to image data. When the tilt angles of the mirrors are changed according to image data, the light beams supplied from the illumination optics 1 can be allowed to enter the projecting optics 3 selectively according to each pixel. Instead of the DMD 2, for example, a reflection type or transmission type liquid crystal display device can compose the light modulating device.

The projecting optics 3 is an optics for enlarging the light modulated by the DMD 2 so as to project it onto a screen as a surface to be projected.

(2. The Constitution of the Illumination Optics)

The illumination optics 1 has a first light source section 11, a second light source section 12, a color wheel 13, a deflecting member 14, an integrator rod 15, a relay lens group 16, a reflection mirror 17 and a prism unit 18.

For convenience of the explanation hereafter, a "reference axis" is defied as follows. That is to say, the "reference axis" means an optical axis of the emitted light from the first light source section 11 (or the second light source section 12) in an optical path from the first light source section 11 (or the second light source section 12) to the integrator rod 15, or an axis on an extended line including the optical axis. The "reference axis" is defined because the "optical axis" means a line which connects curvature centers of optical surfaces of the lenses, but the optical axes of the emitted light beams from the first light source section 11 and the second light source section 12 do not pass through the curvature center of a condenser lens 41, mentioned later, and thus the concept of not the "optical axis" but the defined "reference axis" is suitable in this embodiment. The "reference axis" is used as the need arises, and the reference axis of the first light source section 11 is defined as a reference axis A, and the reference axis of the second light source section 12 is defined as a reference axis B.

The first light source section 11 is composed of a light emitting section 21, a revolving parabolic mirror 22, a condenser lens 23, a reflection mirror 24 and a condenser lens 41.

The light emitting section 21 is composed of an arc tube which causes discharge between two electrodes so as to emit white light, and is positioned on a focal point of the revolving parabolic mirror 22. The revolving parabolic mirror 22 reflects the light emitted from the light emitting section 21 so as to convert the emitted light into parallel light. The condenser lens 23 converges the parallel light which is reflected by the revolving parabolic mirror 22 and is emitted. The revolving parabolic mirror 22 and the condenser lens 23 compose a first light condensing section which condenses the light emitted from the light emitting section 21. The reflection mirror 24 is an optical element which reflects the light emitted from the condenser lens 23 to a direction of the condenser lens 41 at a later tier, and bends its optical path. The condenser lens 41 composes a second light condensing section which condenses the light reflected by the reflection mirror 24 onto a light incident surface 15a of the integrator rod 15. The condenser lens 41 is shared by the first light source section 11 and the second light source section 12.

The first light source section 11 is arranged so that a part of the reference axis A tilts with respect to an optical axis C of the integrator rod 15. That is to say, the first light source section 11 is arranged so that the reference axis A tilts with respect to the optical axis C on the optical path from the light emitting section 11 to the deflecting member 14. Since the first light source section 11 has the reflection mirror 24, the reference axis A is bent by the reflection mirror 24.

On the other hand, the second light source section 12 is composed of a light emitting section 31, a revolving parabolic mirror 32, a condenser lens 33, a reflection mirror 34 and the condenser lens 41.

Similarly to the light emitting section 21, the light emitting section 31 is composed of an arc tube which causes discharge between two electrodes so as to emit white light, and is positioned on a focal point of the revolving parabolic mirror 32. The light emitting section 31 is arranged so as to be opposed to the light emitting section 21 across the optical axis C of the integrator rod 15. The revolving parabolic mirror 32 reflects light emitted from the light emitting section 31 so as to convert the emitted light into parallel light. The condenser lens 33 converges the parallel light which is reflected by the revolving parabolic mirror 32 and is emitted. The revolving parabolic mirror 32 and the condenser lens 33 compose a first light condensing section which condenses the light emitted from the light emitting section 31. The reflection mirror 34 is an optical element which reflects the light emitted from the condenser lens 33 to a direction of the condenser lens 41 at a later tier, so as to bend its optical path.

Similarly to the first light source section 11, the second light source section 12 is arranged so that a part of the reference axis B tilts with respect to the optical axis C of the integrator rod 15. That is to say, the second light source section 12 is arranged so that the reference axis B tilts with respect to the optical axis C on the optical path from the light emitting section 31 and the deflecting member 14. Since the second light source section 12 has the reflection mirror 34, the reference axis B is bent by the reflection mirror 34.

The color wheel 13 is a time sharing color separation device which rotationally moves different color filters arranged on one plane so that the filters cross the optical paths of the emitted light beams from the first light source section 11 and the second light source section 12 so as to separate the emitted light beams to enter into different color light beams. More concretely, the color wheel 13 has three kinds of color filters 13R, 13G and 13B (see FIG. 1) which selectively transmit red light, green light and blue light, and is provided on the light incident side of the integrator rod 15. Due to the rotation of the color wheel 13, the illumination light of white light which enters the color wheel 13 is separated into red light, green light and blue light temporarily so as to be emitted. As a result, a color image can be provided.

In this embodiment, the color wheel 13 is arranged between the condenser lens 41 and the deflecting member 14, but may be arranged between the deflecting member 14 and the integrator rod 15.

In this embodiment, the emitted light beams from the first light source section 11 and the second light source section 12 are not condensed on one point of the color wheel 13, and the reference axes A and B which cross the color wheel 13 are separated from each other. The most notable characteristic of the present invention is how the emitted light beams enter the color wheel 13, but this is explained later.

The deflecting member 14 is arranged on the light incident side of the integrator rod 15, and it transmits and deflects the emitted light beams so that the reference axis A of the emitted light from the first light source section 11 and the reference axis B of the emitted light from the second light source section 12 just before entering the integrator rod 15 become approximately perpendicular to the light incident surface 15a of the integrator rod 15 (approximately parallel with the optical axis C (center axis) of the integrator rod 15). In this embodiment, the deflecting member 14 is composed of a deflecting prism as a refraction type optical element. Details of the deflecting member 14 are explained later.

The integrator rod 15 has a rectangular column shape whose section is rectangular, and it totally reflects the light which enters the light incident surface 15a as one end surface and leads the reflected light to the light emission surface 15b as the other end surface so as to emit the light therefrom. Particularly in this embodiment, the integrator rod 15 composes a synthesizing section which synthesizes the emitted light beams from the first light source section 11 and the second light source section 12 and makes the illuminance distribution uniform so as to emit the synthesized light. When such an integrator rod 15 is used, the satisfactory illuminance distribution of the illumination area can be obtained. The optical axis C of the integrator rod 15 matches with the optical axis of the relay lens group 16.

Further, due to the above deflection of the emitted light beams in the deflecting member 14, the reference axes A and B of the emitted light beams are separated from each other on the light incident surface 15a of the integrator rod 15. In this embodiment, therefore, the integrator rod 15 is arranged so that separating direction of the reference axes A and B is a direction of a long side of the rectangular light incident surface 15a. More concretely, the integrator rod 15 is arranged so that a plane including the reference axes A and B and the long side of the incident light surface 15a of the integrator rod 15 form an angle of 11.7°. As a result, the emitted light beams can be efficiently brought into the integrator rod 15.

The relay lens group 16 is composed of a plurality of relay lenses and a diaphragm for regulating light flux, and its optical axis passes through a center of the light incident surface 15a and a center of the light emission surface 15b of the integrator rod 15. The relay lens group 16 as well as the prism unit 18 approximately optically-conjugated the light emission surface 15b of the integrator rod 15 and the modulation surface (display area) of the DMD 2. The light emission surface 15b of the integrator rod 15 and the display area of the DMD 2 have approximately similar figure. As a result, an image on the light emission surface 15b of the integrator rod 15 is projected onto the modulation surface of the DMD 2, and can be illuminated uniformly and efficiently. The reflection mirror 17 reflects the light emitted from the relay lens group 16 to a direction of the prism unit 18.

The prism unit 18 is composed of a lens prism 19 and a total reflection prism 20. The lens prism 19 has a first incident surface 19a and a first emission surface 19b. The total reflection prism 20 has a second incident surface 20a, a critical surface 20b and a second emission surface 20c. The lens prism 19 and the total reflection prism 20 are arranged so that the first emission surface 19b is opposed to the critical surface 20b via an air layer. Further, the first incident surface 19a of the lens prism 19 has a spherical shape in order to make the illumination light telecentric, and has a lens function. The first incident surface 19a may be a plane, and a plano-convex lens may be laminated to the plane.

In the above constitution, the light emitted from the light emitting section 21 of the first light source section 11 is reflected by the revolving parabolic mirror 22 so as to be the parallel light. After the parallel light is converged by the condenser lens 23, the light enters the reflection mirror 24. The reflection mirror 24 reflects the incident light, the reflected light is further converged by the condenser lens 41 so as to enter the color wheel 13. Meanwhile, the light emitted from the light emitting section 31 of the second light source section 12 is reflected by the revolving parabolic mirror 32 so as to be the parallel light. After the parallel light is converged by the condenser lens 33, the light which enters the reflection mirror 34 is reflected and is further converged by the condenser lens 41 so as to enter the color wheel 13.

The respective light beams (white light beams) which enter the color wheel 13 sequentially transmit through the color filters 13R, 13G and 13B by rotation of the color wheel 13. As a result, the red, green and blue light beams are emitted from the color wheel 13 temporarily so as to enter the deflecting member 14.

The emitted light beams from the first light source section 11 and the second light source section 12 are refracted by the deflecting member 14, and enters the light incident surface 15a of the integrator rod 15 with the reference axes A and B being approximately perpendicular to the light incident surface 15a. After the emitted light beams are synthesized by the integrator rod 15, they enter the reflection mirror 17 via the relay lens group 16. The optical paths of the incident light beams are bent by the reflection mirror 17, and the light beams enter the prism unit 18.

The light beams which enter the prism unit 18 enter the first incident surface 19a of the prism lens 19 so as to be telecentric light beams and reach the first emission surface 19b. At this time, since the incident light beams reach the first emission surface 19b at an angle which does not satisfy the total reflection condition, the incident light beams transmit through the first emission surface 19b, and enter the total reflection prism 20 from the critical surface 20b via the air layer so as to enter the DMD 2 via the second incident surface 20a.

In the DMD 2, the tilt angles of the mirrors change between the ON state and the OFF state according to image data. The light (projected light) which is reflected by the mirror in the ON state enters the total reflection prism 20 again from the second incident surface 20a so as to reach the critical surface 20b. Since the projected light enters the critical surface 20b at the angle which satisfies the total reflection condition, it is totally reflected by the critical surface 20b and is emitted from the second emission surface 20c so as to be projected onto the screen via the projecting optics 3.

In this embodiment, the first light source section 11 and the second light source section 12 have the reflection mirrors 24 and 34, respectively, so that the optical paths of the emitted light beams are bent. For this reason, the emitted light beams from the first light source section 11 and the second light source section 12 can be allowed to enter the integrator rod 15 without being interfered with each other. Therefore, the emitted light beams from the first light source section 11 and the second light source section 12 are effective used so that a projected image with high brightness can be obtained securely.

In addition, the light emitting sections 21 and 31 are arranged so as to be opposed to each other across the optical axis C. As a result, for example, the first light source section 11 and the second light source section 12 can be arranged at the same height. Due to this arrangement, even if a projecting position is changed, the entire device is rotated about an axis which connects the light emitting sections 21 and 31 so that the light emitting sections 21 and 31 do not tilt with respect to a surface perpendicular to a vertical direction. When the light emitting sections 21 and 31 tilt with respect to the surface perpendicular to the vertical direction, the operations of the light emitting sections 21 and 31 become unstable, but with the above constitution, while the stable operations of the light emitting sections 21 and 31 are being maintained, only the setting state of the device can be changed.

The opposed arrangement of the light emitting sections 21 and 31 can realize the image projecting apparatus which is compact and is well-organized when an electric system and a cooling system are taken into consideration. That is to say, as to the electric system, a power supply for supplying a power to the light emitting sections 21 and 31 can be arranged, for example, between the reflection mirrors 24 and 34, and thus an empty space can be utilized effectively.

As to the cooling system, for example, when the reflection mirrors 24 and 34 are composed of cold mirrors which transmit infrared rays, only the white light in the light beams emitted from the light emitting sections 21 and 31 is reflected by the cold mirrors so as to enter the condenser lens 41. Whereas the infrared rays are transmitted through the cold mirrors so as not to enter the condenser lens 41. Therefore, a thermal burden on the optical element (for example, the color wheel 13) after the condenser lens 41 can be reduced securely. Further, when a member which absorbs the infrared rays transmitted through the reflection mirrors 24 and 34 is provided between the reflection mirrors 24 and 34, the light emitting sections 21 and 31 are not exposed to the infrared rays transmitted through the reflection mirrors 24 and 34. For this reason, the stability (cooling balance) of the light emitting sections 21 and 31 is improved and its reliability is improved.

Since the condenser lens 41 is shared by the first light source section 11 and the second light source section 12, the first light source section 11 and the second light source section 12 can be arranged so as to be far from the integrator rod 15 without deteriorating the utilization efficiency of the emitted light beams. As a result, the color wheel 13 can be arranged between the integrator rod 15 and the condenser lens 41 without interfering with the first light source section 11 and the second light source section 12. That is to say, the space for arranging the color wheel 13 can be secured between the integrator rod 15 and the condenser lens 41.

Figure 1:
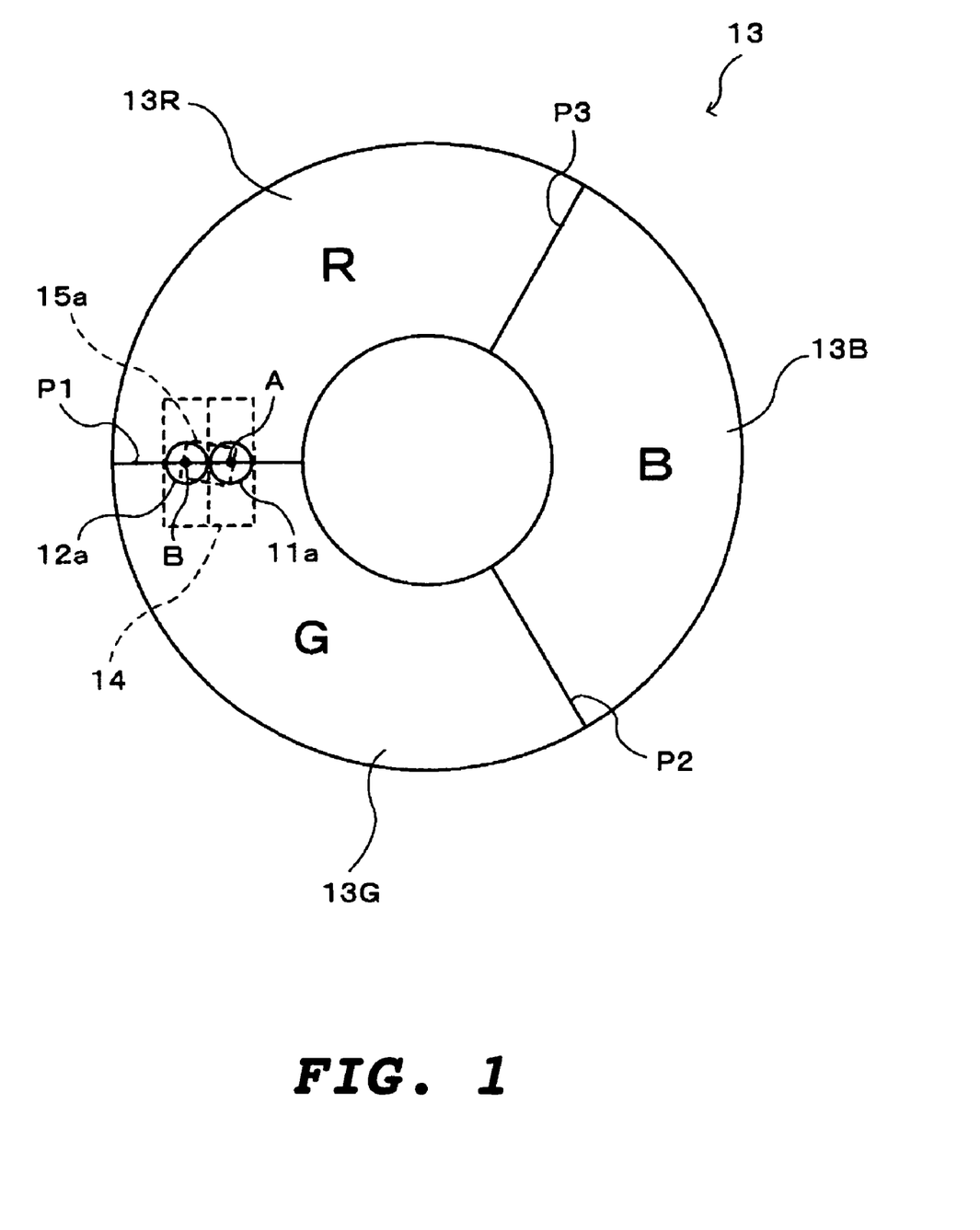
FIG. 1 is an explanatory diagram illustrating a schematic constitution of a color wheel of an illumination optics to be used in an image projecting apparatus according to one embodiment of the present invention and typically illustrating a positional relationship between the color wheel and light fluxes of emitted light beams to enter.

Like this embodiment, therefore, when the color wheel 13 is arranged on the light incident side of the integrator rod 15, even if the light beams pass through the vicinities of the boundaries of the color filters 13R, 13G and 13B of the color wheel 13, the mixed color light beams are mixed in the integrator rod 15 so as to be supplied to the DMD 2. For this reason, unlike the case where the color wheel 13 is arranged on the light emission side of the integrator rod 15, partial color shading do not occur on the modulation surface of the DMD 2. Therefore, an image can be projected without switching the mirrors of the DMD 2 into the OFF state in the rotating position of the color wheel 13 where color mixing occurs, and thus the utilization efficiency of the light beams is not deteriorated.

In this embodiment, since the condenser lens 42 is shared by the first light source section 11 and the second light source section 12, the number of condenser lenses can be totally reduced, so that the number of optical parts can be reduced.

In this embodiment, since unnecessary color light do not enter the integrator rod 15, the thermal burden on the integrator rod 15 and the burden of light resistance on an anti-reflection coat of the light incident surface 15a of the integrator rod 15 can be reduced. As a result, the reliability of the integrator rod 15 can be improved, and the integrator rod 15 is made of an inexpensive material (for example, glass), so that the cost can be reduced.

When the two reflection mirrors 24 and 34 and the condenser lens 41 are provided, the light source sections can be arranged in the opposed manner. Further, overheat of the light source sections is prevented so that they are easily cooled, and NA (Numerical Aperture) with respect to the integrator rod 15 is secured and incidence efficiency is maintained, whereas the light source sections can be arranged so as to be separated from the integrator rod 15. As a result, the color wheel 13 can be spatially arranged on the light incident side of the integrator rod 15.

(3. The Method of Allowing the Emitted Light Beams to Enter the Color Wheel)

As a characteristic portion of the present invention, the method of allowing the emitted light beams from the first light source section 11 and the second light source section 12 to enter the color wheel 13 is explained below.

As shown in FIG. 2, in this embodiment, the first light source section 11 and the second light source section 12 are constituted and arranged so that the reference axes A and B of the emitted light beams to enter the color wheel 13 are separated from each other on the color wheel 13. Since the light fluxes of the emitted light beams are not completely superposed on each other on the color wheel 13, considerable heat energy is not generated concentratedly on one point of the color wheel 13. The respective color filters 13R, 13G and 13B (see FIG. 1) of the color wheel 13 are formed by, for example, dielectric films, and thus their heat resistance is inferior. In this embodiment, however, since the considerable heat energy is not generated concentratedly on one point of the color wheel 13 depending on the method of allowing the emitted light beams to enter the color wheel 13, a deterioration in the property of the color wheel 13 (occurrence of color shading, which does not occur at the time of designing, due to rise in temperature) and a crack of the color wheel 13 can be avoided.

When the reference axes A and B of the emitted light beams to enter the color wheel 13 are separated from each other, the deterioration in the property of the color wheel 13 due to the heat energy can be avoided. For this reason, even in the case where the integrator rod 15 is provided on the optical path like this embodiment, the color wheel 13 can be arranged on the light incident side of the integrator rod 15, namely, on the side which is closer to the first light source section 11 and the second light source section 12 which is easily influenced by heat. Therefore, when the reference axes A and B of the emitted light beams are separated from each other on the color wheel 13, the occurrence of partial color shading on the modulation surface of the DMD 2 can be suppressed.

FIG. 1 is an explanatory diagram illustrating the schematic constitution of the color wheel 13, and typically illustrating a positional relationship between the color wheel 13 and the light fluxes of the emitted light beams to enter there. In FIG. 1, the light flux emitted from the first light source section 11 is designated by 11a, and the light flux emitted from the second light source section 12 is designated by 12a. A border line between the adjacent color filters 13R and 13G is designated by P1, a border line between the adjacent color filters 13G and 13B is designated by P2, and a border line between the adjacent color filter 13B and 13R is designated by P3.

In this embodiment, the color filters 13R, 13G and 13B of the color wheel 13 are formed so that the border lines P1, P2 and P3 cross the reference axes A and B approximately simultaneously at the time of rotation. More concretely, the border lines P1, P2 and P3 are formed along a radial direction from the rotating center of the color wheel 13, and an angle (center angle) formed by the adjacent border lines is 120°. The respective color filters 13R, 13G and 13B are formed in area which is surrounded by the adjacent border lines, an inner periphery and an outer periphery of the color wheel 13, respectively.

Depending on the shape of the color filters 13R, 13G and 13B, a direction where the two light fluxes 11a and 12a are synthesized is perpendicular to a scanning direction (rotational moving direction) of the color filters 13R, 13G and 13B, and the border lines P1, P2 and P3 cross the reference axes A and B approximately simultaneously at the time of the rotation of the color wheel 13. As a result, even when the emitted light beams from the first light source section 11 and the second light source section 12 enter the adjacent color filters of the color wheel 13, a ratio of the time for the incidence over the adjacent color filters (color light switching time) to the time for the rotation of the color wheel 13 can be totally suppressed minimum. Therefore, mixing of color light beams at the time of passing through the color wheel 13 can be suppressed to minimum, and thus the deterioration in the quality of the projected image due to the color mixing can be avoided.

Since the ratio of the time for switching color light beams becomes small, even if the DMD 2 is not turned OFF in the rotating position of the color wheel 13 where the color mixing occurs, the influence of the mixed color light on the projected image can be suppressed as much as possible. As a result, the DMD 2 can be illuminated efficiently, and a bright illumination system can be realized. Further, since the ratio of the time for switching color light beams becomes small, color purity can be improved.

When the border lines of the adjacent color filters cross the reference axes A and B approximately simultaneously due to the rotation of the color wheel 13, the emitted light beams from the first light source section 11 and the second light source section 12 (a plurality of the light flux 11a and the light flux 12a) enter the color wheel 13 with them being lined in a direction of the border lines. As a result, when the light flux 11a and the light flux 12a enter one border line (for example, the border line P1) of the rotating color wheel 13 with them being lined in the direction of the border lines, it can be said that the deterioration in the quality of the projected image due to the color mixing can be avoided.

Figure 4:
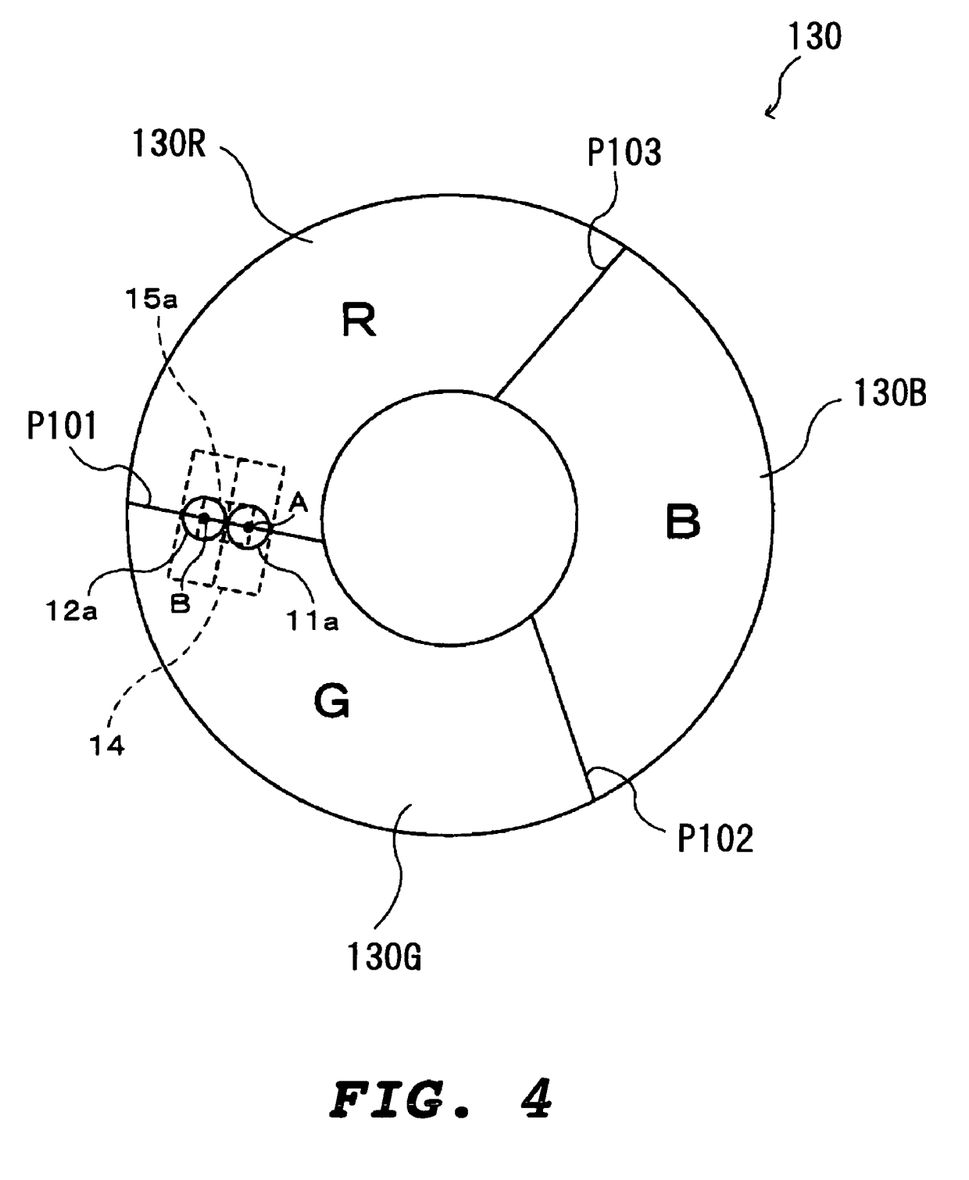
FIG. 4 is an explanatory diagram illustrating another constitutional example of the color wheel and typically illustrating a positional relationship between the color wheel and the light fluxes of the emitted light beams to enter the color wheel.

The shape of the color filters 13R, 13G and 13B is not limited to the shape in FIG. 1. FIG. 4 is an explanatory diagram illustrating another constitutional example 130 of the color wheel 13 and typically illustrating a positional relationship between the color wheel 130 and the light fluxes of the emitted light beams to enter there. The shape of the color filters 130R, 130G and 130B is specified by the border lines P101, P102 and P103, and the inner periphery and the outer periphery of the color wheel 130. For this reason, as shown in FIG. 4, when the direction of the border lines P101, P102 and P103 is changed so that the border lines P101, P102 and P103 tilt with respect to the radial direction of the color wheel 130, the shape of the color filters 103R, 130G and 130B is set. That is to say, the shape of the color filters 130R, 130G and 130B is set so that the border lines P101, P102 and P103 of the adjacent color filters cross the reference axes A and B approximately simultaneously at the time of the rotation.

For example, in the case where a height-wise direction of the color wheel 13 is restricted in order to, for example, suppress a height-wise direction of the image projecting apparatus, or in the case where the arrangement of the first light source section 11 and the second light source section 12 is restricted, the color wheel 130 shown in FIG. 4 is used. As a result, the effects of the present invention are obtained, and simultaneously the invention can be cope with such requirements.

Figure 5:
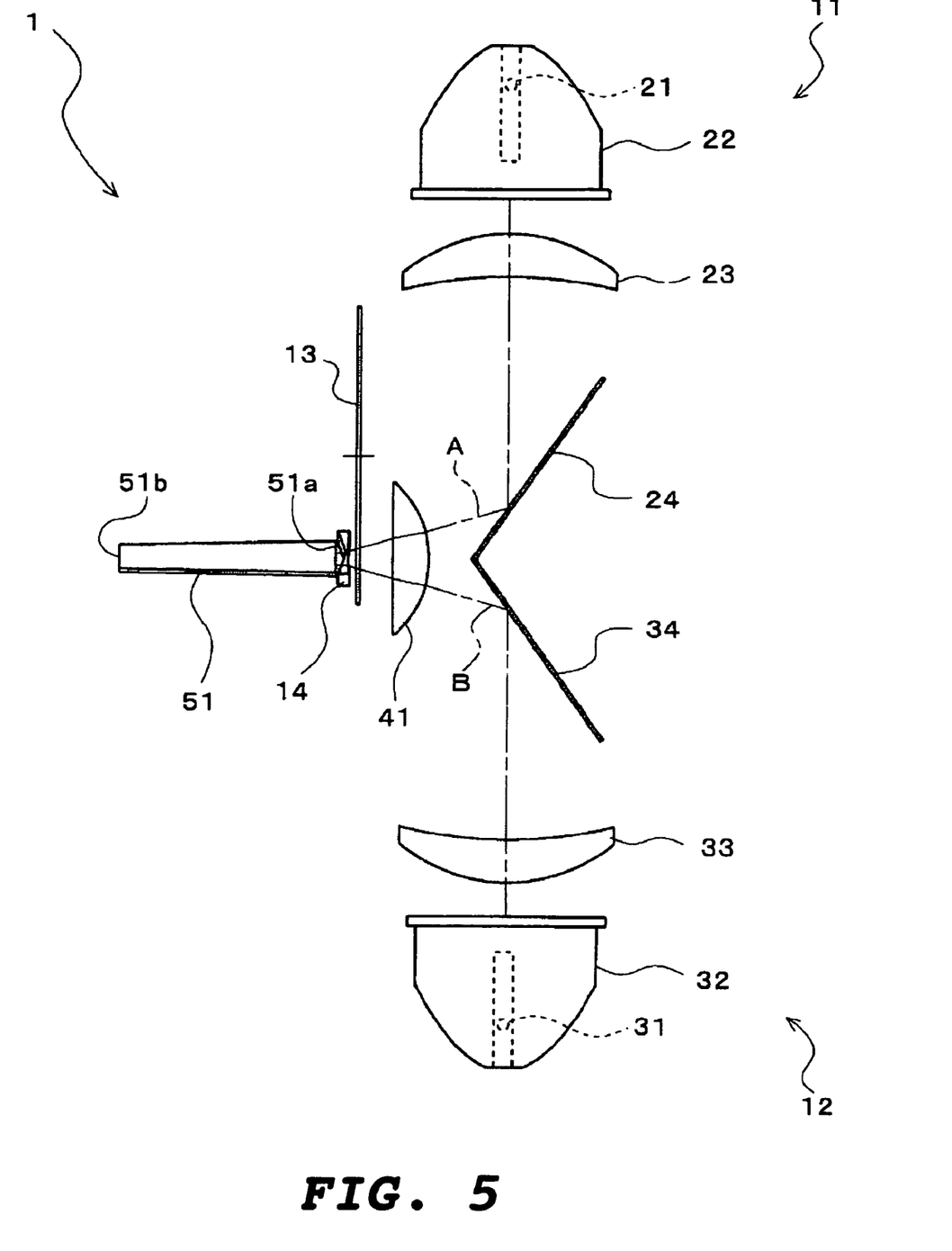
FIG. 5 is a plan view illustrating another constitution of the illumination optics.

FIG. 5 is a plan view illustrating another constitution of a main section of the illumination optics 1. As shown in FIG. 5, a taper rod 51 may be used instead of the integrator rod 15. The taper rod 51 is an integrator rod in which the area of the light incident surface 51a is larger than an area of the light emission surface 15b. When such a taper rod 51 is used as the synthesizing section, in comparison with the case where the integrator rod 15 in which the areas of the light emission surface 15b and the light incident surface 15 are the same, receiving efficiency of the emitted light beams from the first light source section 11 and the second light source section 12 can be heightened, and thus the emitted light beams can be utilized effectively.

Particularly, when the tapered shape is such that the direction of the long side of the light incident surface 51a is widened along a direction where the reference axes A and B of the emitted light beams to enter the light incident surface 51a of the taper rod 51 are separated from each other on the light incident surface 51a, the receiving efficiency of the emitted light beams can be further heightened.

In FIG. 5, the deflecting member 14 is arranged rotatively about the optical axis of the taper rod 51 so that the separating direction of the reference axes A and B of the emitted light beams is the direction of the long side of the light incident surface 51a of the taper rod 51. When the height position of the light emitting sections 21 and 31 (position perpendicular to paper surface of FIG. 4) is adjusted according to the rotation (tilt), the separating direction of the reference axes A and B is the direction of the long side of the light incident surface 51a, so that the emitted light beams easily enter the taper rod 51.

When the taper rod 51 is used, the numerical aperture NA of the tapered direction (the long-side direction of the light incident surface 51a) becomes large. For this reason, the corresponding relay lens group 16 and projecting optics 3 should be used, but they may be used after the entire system is considered.

(4. About the Deflecting Member)

Figure 6:
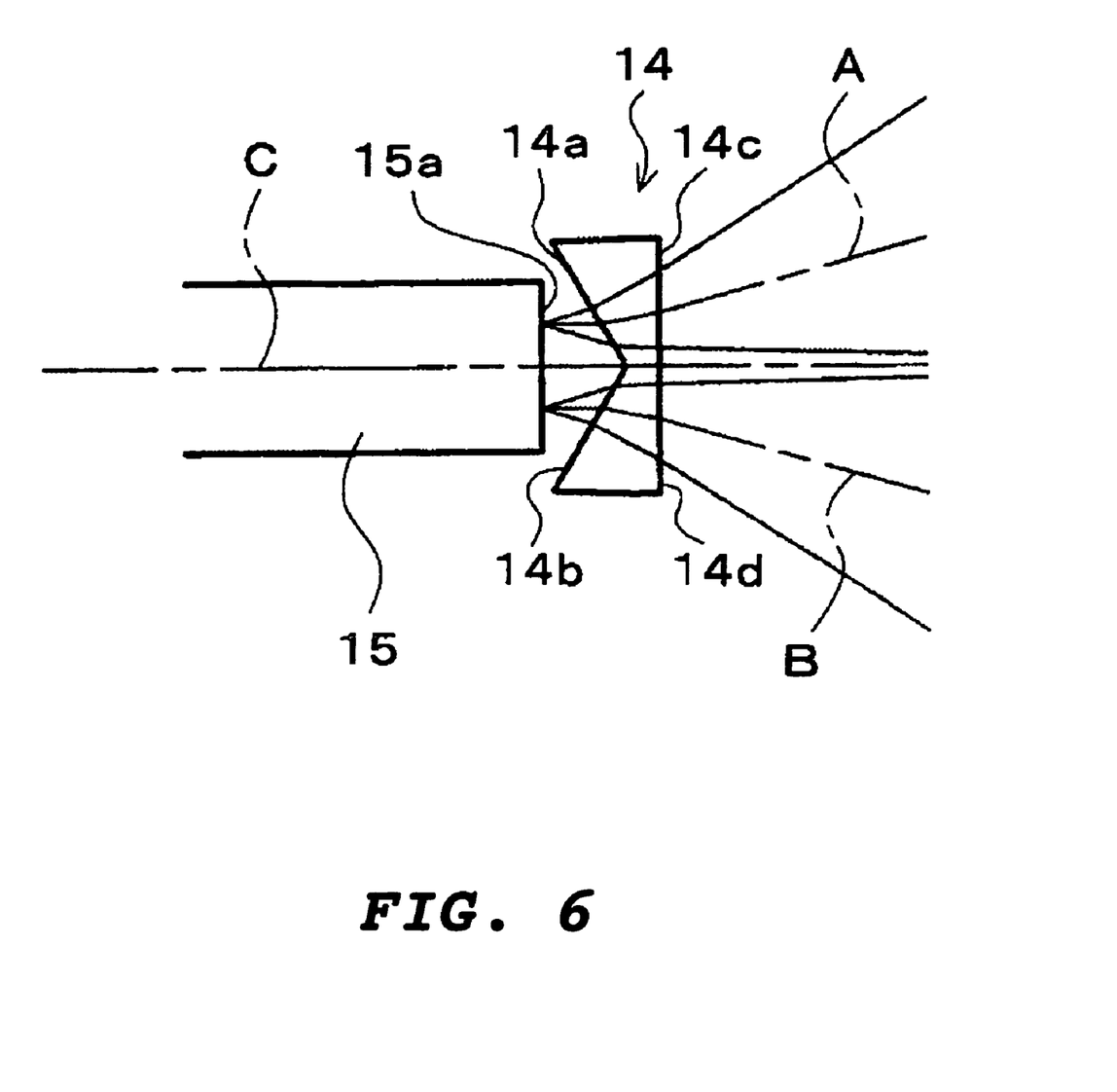
FIG. 6 is a plan view illustrating a detailed constitution of a deflecting member in the illumination optics.

Details of the deflecting member 14 are explained below. FIG. 6 is a plan view illustrating a detailed constitution of the deflecting member 14. The deflecting member 14 has a shape such that its thickness along the optical axis C of the integrator rod 15 in the section along the plane including the reference axes A and B is the largest in a position where it is the farthest from the optical axis C and is the smallest on the optical axis C.

More specifically, the deflecting member 14 has surfaces 14a and 14b on the light emission side, and surfaces 14c and 14d on the light incident side. The surface 14a is a first light emission surface which refracts the emitted light from the first light source section 11, and the surface 14b is a second light emission surface which refracts the emitted light from the second light source section 12. The surface 14c is a first light incident surface which refracts the emitted light from the first light source section 11, and the surface 14d is a second light incident surface which refracts the emitted light from the second light source section 12. The surfaces 14a and 14b tilt with respect to the optical axis C so that their ends on the side of the optical axis C are closer to the surfaces 14c and 14d on the light incident side than their ends on the opposite side to the optical axis C. The arrangement of the surfaces 14a and 14b can realize the above shape of the deflecting member 14. The surfaces 14c and 14d on the light incident side may tilt with respect to the optical axis C so that their ends on the side of the optical axis C is closer to the surfaces 14a and 14b than their ends on the opposite side to the optical axis C.

When the deflection member 14 has such a shape, the deflection member 14 can deflect (refract) the emitted light beams from the first light source section 11 and the second light source section 12 securely so that the reference axes A and B of the emitted light beams just before entering the integrator rod 15 are approximately perpendicular to the light incident surface 15a of the integrator rod 15a. The approximately perpendicular state includes a completely perpendicular state, and a state which slightly shifts from the completely perpendicular state.

When the reference axes A and B of the emitted light beams just before entering the integrator rod 15 are approximately perpendicular to the light incident surface 15a of the integrator rod 15, even in the case where an image is projected only by one light beam, the quality of the projected image can be improved. The reason for this is as follows.

When the length of the integrator rod 15 is infinite, even if an incident angle of the light with respect to the light incident surface 15a of the integrator rod 15 becomes large, it seemed that the light with sufficiently uniform illuminance distribution is emitted from the light emission surface 15b due to the total reflection in the integrator rod 15. Since the length of the integrator rod 15 is, however, finite actually, when the incident angle of the light with respect to the light incident surface 15a becomes large, the illuminance distribution cannot be made to be sufficiently uniform by the integrator rod 15. Since angle distribution of the light to enter the integrator rod 15 with respect to the optical axis C is maintained, when the incident angle with respect to the incident surface 15a becomes large, light quantity distribution in pupil (diaphragm position) of the relay lens group 16 and the projecting optics 3 becomes non-uniform.

As a result, in order to make the light quantity distribution in the pupil of the relay lens group 16 or the like uniform, the angle distribution of the light to enter the integrator rod 15 whose length is finite may be made to be uniform with respect to the optical axis C (symmetrical with respect to the axis along the optical axis C). Therefore, when the reference axes A and B of the emitted light beams just before entering the integrator rod 15 may be set to be approximately perpendicular to the light incident surface 15a of the integrator 15 by the constitution of the deflecting member 14, the angle distribution of the emitted light beams just before entering the integrator rod 15 with respect to the optical axis C becomes approximately uniform. For this reason, the light quantity distribution of the emitted light beams in the pupil of the relay lens group 16 or the like can be made to be uniform. That is to say, even in the case where only the emitted light beam from the first light source section 11 enters the integrator rod 15 via the deflecting member 14, or in the case where only the emitted light beam from the second light source section 12 enters the integrator rod 15 via the deflecting member 14, the light quantity distribution in the pupil of the relay lens group 16 or the like can be made to be uniform.

In the case where the light enters a position which shifts from the center of the light incident surface 15a, since the length of the integrator rod 15 is finite, the light quantity distribution in the pupil of the relay lens group 16 or the like becomes slightly non-uniform, but a non-uniform level is not higher than the case where the angle distribution of the incident light beams becomes non-uniform. Therefore, the non-uniformity can be compensated sufficiently by making the angle distribution of the emitted light beams uniform.

When the reference axes A and B of the emitted light beams just before entering the integrator rod 15 are set to be approximately perpendicular to the light incident surface 15a of the integrator rod 15, even when an image is projected by using only one of the first light source section 11 and the second light source section 12, the light quantity distribution in the pupil of the relay lens group 16 can be uniform. As a result, even when the image is projected only by one light beam, occurrence of uneven illuminance on the modulation surface of the DMD 2 can be avoided, and occurrence of uneven illuminance on an image projected onto the screen via the DMD 2 can be avoided. As a result, the quality of the projected image can be improved.

The case where the image is projected only by one light beam means, for example, the case where one light source is not turned on due to a failure, and the case where only one light source is turned on intentionally due to long life or energy saving.

(5. The Others)

The above embodiment explains the example where the first light condensing sections of the light source sections are composed of the revolving parabolic mirrors and the condenser lenses, but they may be composed of revolving elliptical mirrors. In this case, the light emitting section may be positioned in one focal position of the revolving elliptical mirror, and the light incident surface of the synthesizing section may be positioned in the other focal position.

In the above embodiment, as the color filters of the color wheel, three kinds of filters which transmit the red light, the blue light and the green light are used, but filters of another colors may be used. For example, a color filter which transmits magenta, cyan or yellow light may be added. In the case where the color purity is sacrificed and brightness is emphasized, a filter which transmits white light (transparent filter) may be added. The present invention is not particularly limited to types and constitutions of the color filters.

According to the above embodiment, the light beams emitted from the light source sections pass through the color filters of the time sharing color separation device so as to be separated into different color light beams in a time-sharing state. At this time, since the reference axes of the emitted light beams to enter the time sharing color separation device are separated from each other, the light fluxes of the emitted light beams are not completely superposed on each other on the time sharing color separation device. As a result, considerable heat energy is not generated concentratedly on one point of the time sharing color separation device, so that a deterioration in the property of the time sharing color separation device can be avoided.

For example, therefore, even in the case where the synthesizing section (for example, the integrator rod) which synthesizes a plurality of light fluxes and makes the illuminance distribution uniform so as to emit the synthesized light is provided on the optical path, the time sharing color separation device can be arranged on the light incident side of the synthesizing section. As a result, even when the synthesizing section is used, the occurrence of partial color shading on the modulation surface of the light modulating device can be suppressed unlike the case where the time sharing color separation device is arranged on the light emission side of the synthesizing section without turning OFF the light modulating device according to the rotating position of the color filters (without deteriorating the utilization efficiency of the light).

The color filters of the time sharing color separation device are formed so that the border lines of the adjacent color filters at the time of the rotation cross the reference axes approximately simultaneously. As a result, even when the emitted light beams enter the adjacent color filters, the ratio of time for entrance of the light over the adjacent color filters can be suppressed minimum. Therefore, the color mixing of the light at the time of passing through the time sharing color separation device can be suppressed to minimum, so that the deterioration in the quality of the projected image can be avoided.

In the case where the reference axes of the emitted light beams to enter the time sharing color separation device are separated from each other and the border lines of the adjacent color filters cross the reference axes approximately simultaneously at the time of the rotation, a plurality of light fluxes from the light source sections enter the border lines of the adjacent color filters of the rotating time sharing color separation device with them being lined in the direction of the border lines. Therefore, it can be said that such an incident method can produce the above-mentioned effects.

What is claimed is:

1. An illumination optics comprising:
   a plurality of light source sections for emitting light beams; and
   a time sharing color separation device having a plurality of color filters, the color filters being rotationally moved so as to cross optical paths of the emitted light beams from the light source sections, thereby separating the emitted light beams to enter there into different color light beams in a time-sharing state,
   wherein when optical axes of the emitted light beams or axes on extended lines including the optical axes are determined as reference axes, the reference axes of the emitted light beams to enter the time sharing color separation device are separated from each other, and the color filters are formed so that border lines of the adjacent color filters cross the reference axes approximately simultaneously at the time of rotation.

2. The illumination optics according to claim 1, further comprising:
   a synthesizing section for synthesizing the emitted light beams from the light source sections,
   wherein the time sharing color separation device is arranged on a light incident side of the synthesizing section.

3. The illumination optics according to claim 2, wherein the light source sections include:
   light emitting sections for emitting light beams, the light emitting sections being arranged so as to oppose each other across the optical path of the synthesizing section;
   first light condensing sections for condensing the emitted light beams; and
   reflection mirrors for bending optical paths of the light beams emitted from the first light condensing sections by means of reflection, respectively.

4. The illumination optics according to claim 3, wherein the reflection mirrors transmit infrared rays and reflect white light.

5. The illumination optics according to claim 3, wherein the light source sections further includes a second light condensing section for condensing the light beams reflected by the reflection mirrors, and the second light condensing section is shared by the light source sections.

6. The illumination optics according to claim 2, wherein the light source sections are arranged so that the reference axes partially tilt with respect to the optical axis of the synthesizing section, the illumination optics further comprises a deflecting optical element which is provided on the light incident side of the synthesizing section and transmits to deflect the emitted light beams so that the reference axes of the emitted light beams just before entering the synthesizing section are approximately perpendicular to a light incident surface of the synthesizing section.

7. The illumination optics according to claim 2, wherein the synthesizing section includes an integrator rod.

8. The illumination optics according to claim 7, wherein the integrator rod is a taper rod in which an area of a light incident surface is larger than an area of a light emission surface.

9. An illumination optics comprising:
   a first light source section for emitting a first light beam;
   a second light source section for emitting a second light beam; and
   a time sharing color separation device having a plurality of color filters on one plane, the color filters being rotationally moved so as to cross the first and second light beams, thereby separating the first and second light beams to enter there into different color light beams in a time sharing state, wherein the first and second light beams enter the color filters along a direction of a boundary line of the adjacent color filters and the first and second light beams are separated on the surface of the color filters along the direction of the boundary line of the adjacent color filters.

10. The illumination optics according to claim 9, wherein the first and second light beams are condensed in the vicinity of the surface of the color filters.

11. The illumination optics according to claim 9, wherein the first and second light beams on the surface of the color filter are adjacent.

12. An image projecting apparatus, comprising:
an illumination optics including:
a plurality of light source sections for emitting light beams; and
a time sharing color separation device having a plurality of color filters, the color filters being rotationally moved so as to cross optical paths of the emitted light beams from the light source sections, thereby separating the emitted light beams which enter there into different color light beams in a time-sharing state;
a light modulating device for modulating the different color light beams supplied from the illumination optics according to image data; and
a projecting optics for projecting the different color light beams modulated by the light modulating device,
wherein when optical axes of the emitted light beams or axes on extended lines including the optical axes on the optical paths of the emitted light beams are determined as reference axes, the reference axes of the emitted light beams to enter the time sharing color separation device are separated from each other, and the color filters are formed so that border lines of the adjacent color filters cross the reference axes approximately simultaneously at the time of rotation.

13. The image projecting apparatus according to claim 12, wherein the illumination optics further includes a synthesizing section for synthesizing the emitted light beams from the light source sections, and wherein the time sharing color separation device is arranged on a light incident side of the synthesizing section.

14. The image projecting apparatus according to claim 13, wherein the synthesizing section includes an integrator rod.

15. The image projecting apparatus according to claim 14, wherein the integrator rod is a taper rod in which an area of a light incident surface is larger than an area of a light emission surface.

16. The image projecting apparatus according to claim 13, wherein the light source sections include:
light emitting sections for emitting light beams, the light emitting sections being arranged so as to oppose each other across the optical path of the synthesizing section;
first light condensing sections for condensing the emitted light beams; and
reflection mirrors for bending optical paths of the light beams emitted from the first light condensing sections by means of reflection, respectively.

17. The image projecting apparatus according to claim 13, wherein the light source sections further includes a second light condensing section for condensing the emitted light beams reflected by the reflection mirrors, and the second light condensing section is shared by the light source sections.

18. The image projecting apparatus according to claim 12, wherein the light source sections are arranged so that the reference axes partially tilt with respect to the optical axis of the synthesizing section, the illumination optics further comprises a deflecting optical element which is provided on the light incident side of the synthesizing section and transmits to deflect the emitted light beams so that the reference axes of the emitted light beams just before entering the synthesizing section are approximately perpendicular to a light incident surface of the synthesizing section.

* * * * *